United States Patent
Park et al.

(10) Patent No.: US 9,079,624 B2
(45) Date of Patent: Jul. 14, 2015

(54) WALKING ROBOT AND METHOD OF CONTROLLING BALANCE THEREOF

(75) Inventors: Joong Kyung Park, Suweon-si (KR); Woong Kwon, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 675 days.

(21) Appl. No.: 12/978,917

(22) Filed: Dec. 27, 2010

(65) Prior Publication Data

US 2011/0172817 A1 Jul. 14, 2011

(30) Foreign Application Priority Data

Jan. 11, 2010 (KR) .................. 10-2010-0002351

(51) Int. Cl.
*G06F 19/00* (2011.01)
*B62D 57/032* (2006.01)
*B25J 9/16* (2006.01)

(52) U.S. Cl.
CPC ............ *B62D 57/032* (2013.01); *B25J 9/162* (2013.01); *B25J 9/1638* (2013.01)

(58) Field of Classification Search
USPC ........................................................ 700/245
See application file for complete search history.

(56) References Cited

U.S. PATENT DOCUMENTS

| 5,355,064 | A | * | 10/1994 | Yoshino et al. | 318/568.12 |
|---|---|---|---|---|---|
| 5,432,417 | A | * | 7/1995 | Takenaka et al. | 318/568.12 |
| 5,459,659 | A | * | 10/1995 | Takenaka | 700/260 |
| 5,929,585 | A | * | 7/1999 | Fujita | 318/568.2 |
| 5,936,367 | A | * | 8/1999 | Takenaka | 318/568.12 |
| 6,915,230 | B2 | * | 7/2005 | Kawai et al. | 702/139 |
| 7,319,918 | B2 | * | 1/2008 | Takenaka et al. | 700/245 |
| 7,561,941 | B2 | * | 7/2009 | Kwon et al. | 700/245 |
| 7,623,944 | B2 | * | 11/2009 | Dariush | 700/245 |
| 2003/0114960 | A1 | * | 6/2003 | Takenaka et al. | 700/245 |
| 2003/0125839 | A1 | * | 7/2003 | Takenaka et al. | 700/245 |
| 2005/0075755 | A1 | * | 4/2005 | Takenaka et al. | 700/245 |
| 2006/0200272 | A1 | * | 9/2006 | Kawai | 700/245 |
| 2006/0243499 | A1 | * | 11/2006 | Hosoda | 180/8.5 |
| 2009/0187275 | A1 | * | 7/2009 | Suga et al. | 700/245 |

FOREIGN PATENT DOCUMENTS

| EP | 1 018 467 A1 | 7/2000 | |
|---|---|---|---|
| EP | 1018467 A1 | * 7/2000 | ........... B62D 57/032 |
| EP | 1 400 438 A2 | 3/2004 | |
| EP | 1 627 712 A1 | 2/2006 | |
| WO | 03/068453 A1 | 8/2003 | |

OTHER PUBLICATIONS

European Search Report dated Apr. 28, 2011 in corresponding European Patent Application 11150457.7.

* cited by examiner

*Primary Examiner* — Ian Jen
(74) *Attorney, Agent, or Firm* — Harness, Dickey & Pierce, P.L.C.

(57) ABSTRACT

Disclosed herein are a walking robot which controls balance using an ankle when the robot walks, and a method of controlling balance thereof. In a method of determining an angle of an ankle joint without solving a complicated dynamic equation such that the robot stays balanced so as not to fall, an angle of the ground is fixed as a reference angle for balance control of the robot such that the robot stably walks while maintaining the same balance control performance even when the ground is inclined. When the robot moves slowly or quickly, the robot may maintain balance. Since the robot stays balanced using the ankle of a stance leg even when the ground is inclined, the method is simple and is applied to a robot having joints with 6 degrees of freedom.

20 Claims, 6 Drawing Sheets

WALKING ROBOT AND METHOD OF CONTROLLING BALANCE THEREOF

CROSS-REFERENCE TO RELATED APPLICATION

This application claims the priority benefit of Korean Patent Application No. 10-2010-0002351, filed on Jan. 11, 2010 in the Korean Intellectual Property Office, the entire disclosure of which is incorporated herein by reference.

BACKGROUND

1. Field

Embodiments relate to a walking robot, balance of which is controlled using an ankle when the robot walks, and a method of controlling balance thereof.

2. Description of the Related Art

In general, research into a walking robot which has a joint structure similar to that of a human and coexists with the humans in a working and living space has been actively conducted. The walking robot includes a multilegged walking robot having multiple legs such as two legs or three legs. For stable walking, an actuator such as an electric motor or a hydraulic motor mounted in each joint is driven. Examples of a method of driving an actuator include a position-based Zero Moment Point (ZMP) control method of providing a command angle, that is, a command position, of each joint and controlling each joint to move according to the command angle, and a Finite State Machine (FSM) control method of providing command torque of each joint and controlling each joint to move according to the command torque.

In the ZMP control method, a walking direction, a stride width, a walking rate and the like are determined in advance so as to satisfy a ZMP constraint, that is, a condition in which a ZMP is present in a safe area (which corresponds to the area of one foot in the case where the robot is supported by one foot or corresponds to a small area which is set in consideration of safety in a convex polygon including the areas of two feet in the case where the robot is supported by two feet) of a stance polygon formed by stances of legs of the robot, the walking pattern of each leg corresponding to the determination is generated, and the walking trajectory of each leg is calculated according to the walking pattern. The angle of the joint of each leg is calculated by inverse Kinematic calculation of the calculated walking trajectory and a desired control value of each joint is calculated based on the current angle and the desired angle of each joint. Servo control is performed such that each leg moves along the calculated walking trajectory during every control time period. That is, determination as to whether the position of each leg accurately moves along the walking trajectory according to the walking pattern is performed. If each leg deviates from the walking trajectory, the torque of the motor is adjusted such that each leg accurately moves along the walking trajectory.

Since the ZMP control method is a position-based control method, accurate position control is possible. However, since accurate angle control of each joint is performed in order to control the ZMP, high servo gain is necessary. Therefore, since high current is necessary, energy efficiency is low and joint rigidity is high, thereby giving surroundings a big shock. Since Kinematic Singularity is avoided in order to calculate the angle of each joint, the robot always bends its knees while walking. Thus, the robot may unnaturally walk unlike a human.

In contrast, in the FSM control method, instead of the method of controlling the walking of the robot according to the position thereof at every control time, each operation state of the robot is defined in advance (Finite State), desired torque of each joint is calculated by referring to each operation state while walking, and walking is controlled according to the desired torque of each joint. Since the torque of each joint is controlled while walking, low servo gain is necessary, energy efficiency is high and joint rigidity is low, thereby providing safety to surroundings. In addition, since Kinematic Singularity does not need to be avoided, the robot may naturally walk in a state of stretching out its knees similar to a human.

However, in the FSM control method, since the walking of the robot is controlled according to the operation state defined in advance, walking control is inaccurate and thus the robot may lose balance. Accordingly, a separate balancing operation to ensure that the robot maintains balance is performed regardless of a walking operation. For a robot balancing operation, command torque to keep stable balance is obtained. In order to obtain command torque, a very complicated dynamic equation is solved. However, up to now, this method has not been implemented in a robot having legs having a joint structure with 6 degrees of freedom.

SUMMARY

Therefore, it is an aspect to provide a walking robot which keeps balance using an ankle without solving a complicated dynamic equation, and a method of controlling balance thereof.

Additional aspects of the invention will be set forth in part in the description which follows and, in part, will be obvious from the description, or may be learned by practice of the invention.

In accordance with one aspect, there is provided a walking robot having a plurality of legs and a foot provided in each of the plurality of legs, the walking robot including: a first sensor to detect whether the foot touches the ground when the robot walks; a second sensor to detect the pose of the robot when the foot touches the ground; and a walking controller to measure an angle of the ground to generate an ankle reference desired angle to maintain robot balance when the foot touches the ground and to compensate for the reference desired angle according to the pose of the robot to control walking of the robot.

The first sensor may include a Force and Torque (F/T) sensor provided in the foot and an ankle joint portion of the robot to detect whether the foot touches the ground.

The second sensor may include a pose sensor mounted in an upper body of the robot so as to detect inclination or pose of the upper body.

The angle of the ground may be an angle indicating the inclination of the foot relative to the ground.

The reference desired angle may be a desired angle of the foot relative to the ground.

The walking controller may include a desired angle generator to generate the reference desired angle of the foot relative to the ground according to the angle of the ground, a desired angle compensator to obtain a Center of Gravity (COG) position and velocity of the robot according to the pose of the robot and to calculate a compensation angle using the COG position and velocity of the robot, and a desired torque calculator to calculate a final desired angle of the ankle using the reference desired angle and the compensation angle and to calculate torque using the calculated final desired angle.

The desired angle generator may generate the reference desired angle using the angle of the ground as a control desired angle to keep ankle balance.

The reference desired angle, the compensation angle and the final desired angle may follow the orientation of a global coordinate system.

The walking robot may be a robot having two legs, which walks based on torque.

In accordance with another aspect, there is provided a method of controlling balance of a walking robot including a plurality of legs and a foot provided in each of the plurality of legs, the method including: detecting whether the foot touches the ground when the robot walks; measuring an angle of the ground to generate an ankle reference desired angle to maintain robot balance when the foot touches the ground, and detecting the pose of the robot to compensate for the reference desired angle; and calculating a final desired angle of the ankle according to the reference desired angle and the compensation angle to control walking of the robot.

The generation of the reference desired angle may include generating the reference desired angle of the ankle relative to the ground according to the angle of the ground.

The calculation of the compensation angle may include obtaining a Center of Gravity (COG) position and velocity of the robot according to the pose of the robot and calculating a compensation angle using the COG position and velocity of the robot.

The calculation of the final desired angle may include calculating the desired angle of the ankle as a compensation value obtained by adding the compensation angle to the reference desired angle.

The calculation of the final desired angle may include calculating the desired angle of the ankle as a control reference angle to maintain ankle balance.

According to the walking control apparatus and method of the robot, the angle of the ankle joint is determined without a complicated dynamic equation such that the robot keeps balance not to fall.

The angle of the ground is fixed as a reference angle for balance control of the robot such that the robot stably walks while maintaining the same balance control performance even when the ground is inclined.

When the robot slowly or quickly moves, the robot may keep balance.

Since the balance of the robot is kept using the ankle of a stance leg even when the ground is inclined, the method is simple and is applied to a robot having joints with 6 degrees of freedom.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings.

Figure 1:
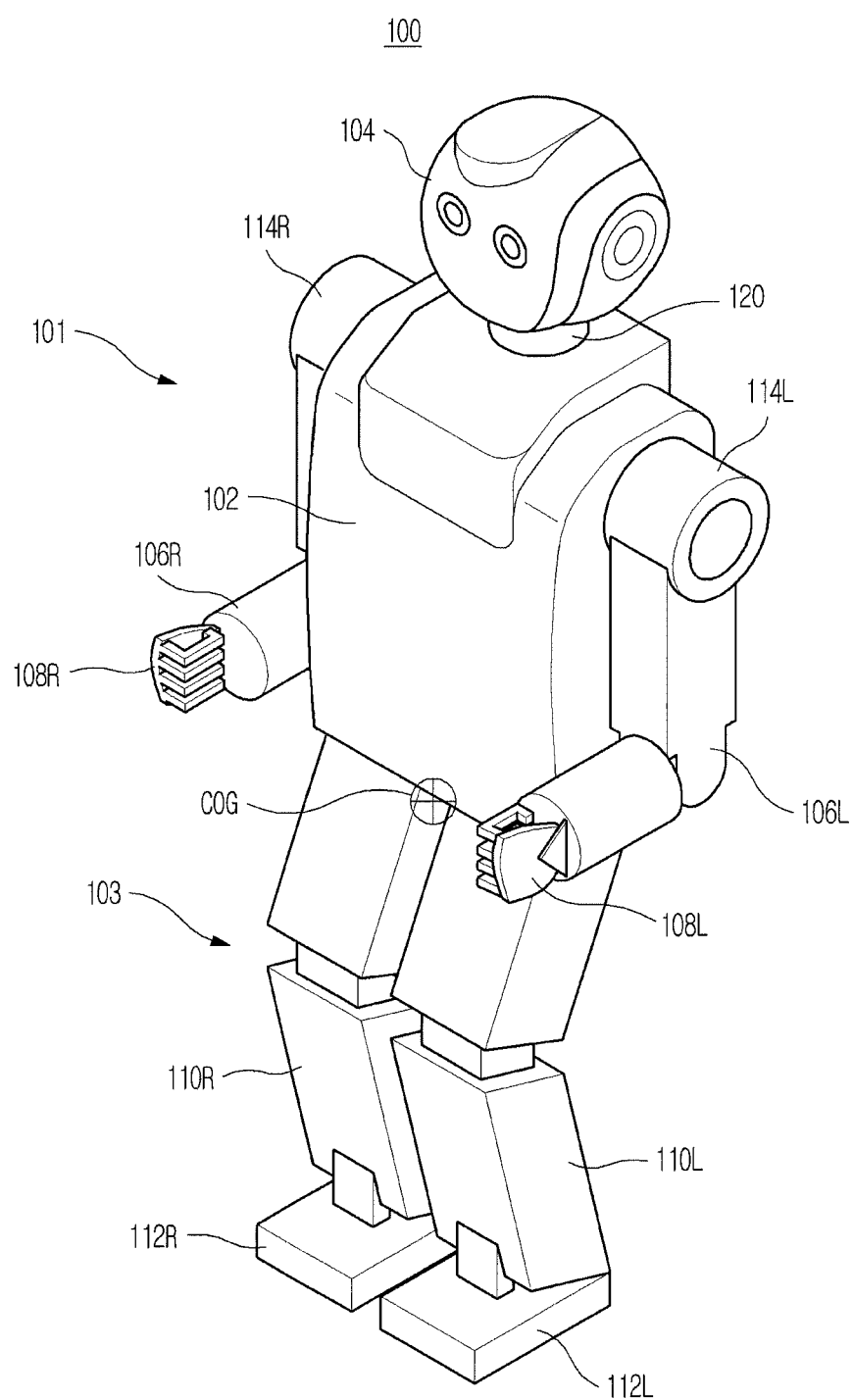
FIG. 1 is a diagram showing the appearance of a robot according to an embodiment.

FIG. 1 is a diagram showing the appearance of a robot according to an embodiment.

In FIG. 1, the robot 100 according to the embodiment is a bipedal robot which walks erect using two legs 110 similar to a human, and includes an upper body 101 including a torso 102, a head 104 and arms 16, and a lower body 103 including two legs 110R and 110L.

The upper body 101 of the robot 100 includes the torso 102, the head 104 connected to the upper portion of the torso 102 via a neck 120, two arms 106L and 106R connected to both sides of the upper portion of the torso 102 via shoulders 114L and 114R, and hands 108L and 108R respectively connected to ends of the two arms 106L and 106R.

The lower body 103 of the robot 100 includes the two legs 110L and 110R connected to both sides of a lower portion of the torso 102 of the upper body 101 and feet 112L and 112R connected to ends of the two legs 110L and 110R.

In the reference numerals, R and L denote the right and the left of the robot 100, respectively, and Center of Gravity (COG) denotes Center of gravity of the robot 100.

Figure 2:
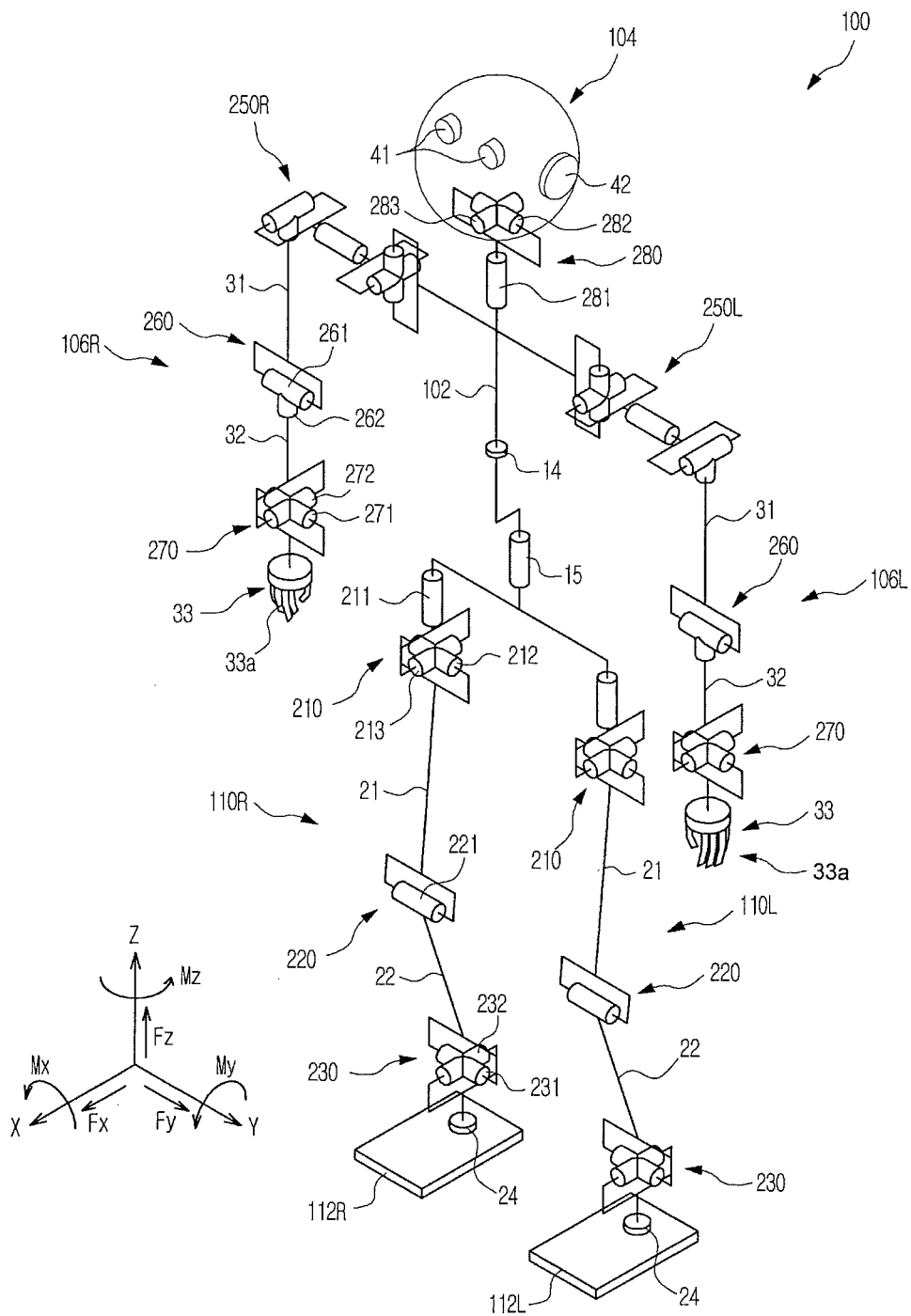
FIG. 2 is a diagram showing the structures of main joints of the robot shown in FIG. 1.

FIG. 2 illustrates structures of main joints of the robot shown in FIG. 1.

In FIG. 2, a pose sensor 14 is provided in the torso 102 of the robot 100. The pose sensor 14 detects an inclination angle of the upper body 101 relative to a vertical axis and an angular velocity thereof so as to generate pose information. The pose sensor 14 may be provided not only in the torso 102 but also in the head 104.

A waist joint portion 15 with a degree of freedom in a yaw direction is provided in the torso 102 such that the upper body 101 may be rotated.

Cameras 41 to photograph surroundings and a microphone 42 to receive user voice are provided in the head 104 of the robot 100.

The head 104 is connected to the torso 102 of the upper body 101 via a neck joint portion 280. The neck joint portion 280 has 3 degrees of freedom including a yaw-direction (Z-axis) rotation joint 281, a pitch-direction (Y-axis) rotation joint 282 and a roll-direction (X-axis) rotation joint 283.

Motors (not shown) (e.g., actuators such as an electrical motor and a hydraulic motor) to rotate the head 104 are connected to the rotation joints 281, 282 and 283 of the neck joint portion 280.

Each of the two arms 106L and 106R of the robot 100 has an upper link 31, a lower link 32 and hands 33.

The upper link 31 is connected to the upper body 101 via each of shoulder joint portions 250L and 250R, the upper link 31 and the lower line 32 are connected to each other via an elbow joint portion 260, and the lower link 32 and the hand 33 are connected to each other via a wrist joint portion 270.

The shoulder joint portions 250L and 250R are mounted at both sides of the torso 102 of the upper body 101 so as to connect two arms 106L and 106R to the torso 102 of the upper body 101.

The elbow joint portion 260 may have two degrees of freedom including a pitch-direction rotation joint 261 and a yaw-direction rotation joint 262.

The wrist joint portion 270 may have two degrees of freedom including a pitch-direction rotation joint 271 and a roll-direction rotation joint 272.

Five fingers 33a are mounted in the hands 33. A plurality of joints (not shown) driven by the motors may be mounted in each of the five fingers 33a. The five fingers 33a perform various operations such as grasping an object or indication of a specific direction in interlock with the motion of the arm 106.

Each of the two legs 110L and 11 OR of the robot 100 has a thigh link 21, a crus link 22 and a foot 112L or 112R.

The thigh link 21 is connected to the torso 102 of the upper body 101 via a hip joint portion 210. The thigh link 21 and the crus link 22 are connected to each other via a knee joint portion 220, and the crus link 22 and the foot 112L or 112R are connected to each other via an ankle joint portion 230.

The hip joint portion 210 may have 3 degrees of freedom including a yaw-direction (Z-axis) rotation joint 211, a pitch-direction (Y-axis) rotation joint 212 and a roll-direction (X-axis) rotation joint 213.

The knee joint portion 220 may have one degree of freedom including a pitch-direction rotation joint 221.

The ankle joint portion 230 may have two degrees of freedom including a pitch-direction rotation joint 231 and a roll-direction rotation joint 232.

Since six rotation joints are provided in each of the two legs 110L and 110R with respect to the hip joint portion 210, the knee joint portion 220 and the ankle joint portion 230, 12 rotation joints are provided with respect to two legs 110L and 110R.

Meanwhile, in each of the two legs 110L and 11R, a multi-axis Force and Torque (F/T) sensor 24 is mounted between the foot 112L or 112R and the ankle joint portion 230. The F/T sensor 24 measures three directional components Fx, Fy and Fz of force transferred from the foot 112L or 112R and three directional components Mx, My and Mz of moment so as to detect landing of the foot 112L or 112R and load applied to the foot 112L or 112R.

Although not shown in the drawings, actuators such as motors to drive the rotation joints are provided in the robot 100. A walking control unit to control the overall operation of the robot 100 adequately controls the motors so as to perform various operations of the robot 100.

Figure 3:
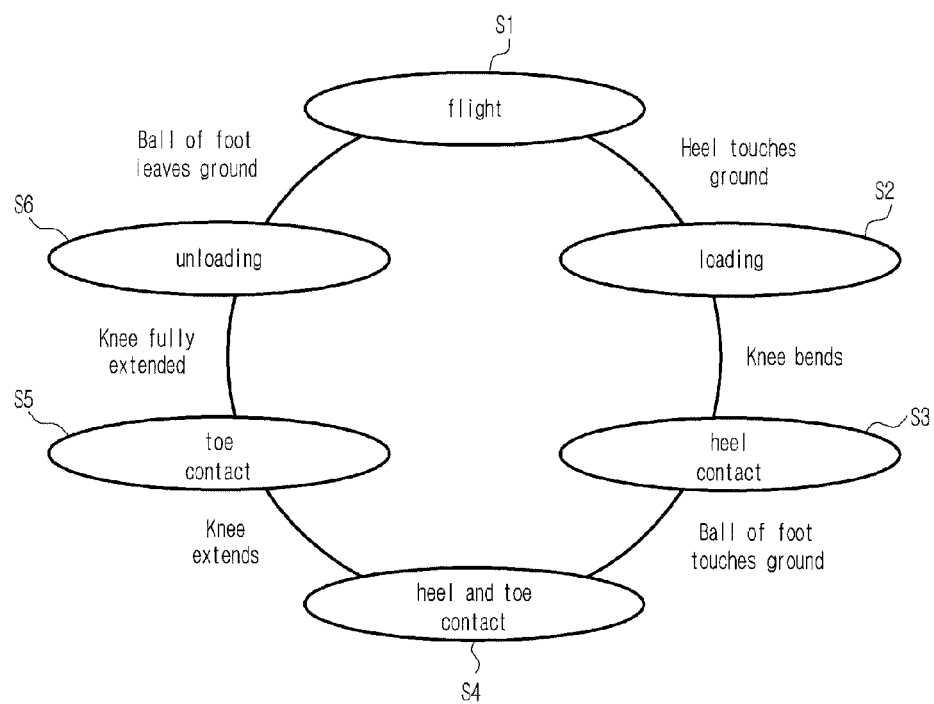
FIG. 3 is a diagram showing operation states of the robot and control operations of the operation states when the robot walks based on a Finite State Machine (FSM), according to the embodiment.

FIG. 3 is a diagram showing operation states of the robot and control operations of the operation states when the robot walks based on a Finite State Machine (FSM), according to the embodiment of the present invention.

In FIG. 3, in a torque-based Finite State Machine (FSM) control method, the operation states of the robot 100 are divided into a plurality of operation states (e.g., six operation states S1, S2, S3, S4, S5 and S6) defined in advance. The operation states S1, S2, S3, S4, S5 and S6 denote poses of one leg 110L or 110R of the robot 100 while walking. The pose of the robot 100 is adequately switched such that the robot stably walks.

A first operation state S1 (flight) denotes a pose in which the leg 110L or 110R swings, a second operation state S2 (loading) denotes a pose in which the foot 112 is put down on the ground, a third operation state S3 (heel contact) denotes a pose in which the heel of the foot 112 touches the ground, a fourth operation state S4 (heel and toe contact) denotes a pose in which the heel and the toe of the foot 112 simultaneously touch the ground, a fifth state S5 (toe contact) denotes a pose in which the toe of the foot 112 touches the ground, and a six operation state S6 (unloading) denotes a pose in which the foot 112 is raised from the ground.

In order to switch one operation state to another operation state, a control action to switch the operation state is necessary.

More particularly, if the first operation state S1 is switched to the second operation state S2 (S1→S2), a control operation (heel touches the ground) to enable the heel of the foot 112 to touch the ground is necessary.

If the second operation state S2 is switched to the third operation state S3 (S2→S3), a control operation (knee bends) to bend the knee (more particularly, the knee joint portion) of the foot 112 which touches the ground is necessary.

If the third operation state S3 is switched to the fourth operation state S4 (S3→S4), a control operation (ball of foot touches the ground) to enable the toe of the foot 110 to touch the ground is necessary.

If the fourth operation state S4 is switched to the fifth operation state S5 (S4→S5), a control operation (knee extends) to extend the knee of the foot 112 which touches the ground is necessary.

If the fifth operation state S5 is switched to the sixth operation state S6 (85→S6), a control operation (knee fully extended) to fully extend the knee of the foot 112 which touches the ground is necessary.

If the sixth operation state S6 is switched to the first operation state S1 (S6→S1), a control operation (ball of foot leaves the ground) to raise the toe of the foot 112 from the ground is necessary.

Accordingly, in order to execute the control action, the robot 100 calculates a torque command of each joint in correspondence with each control action, and outputs the calculated torque command to the actuator such as the motor mounted in each joint so as to drive the actuator.

In the torque-based FSM control method, when the robot 100 walks according to the operation states S1, S2, S3, S4, S5 and S6 defined in advance, the robot 100 may lose balance according to an angle of an ankle (more particularly, an ankle joint portion).

Accordingly, in the torque-based servo control method according to the embodiment of the present invention, an inclination (angle) of the ground is fixed as a reference angle for balance control of the robot 100 to generate a reference desired angle of the ankle, and a compensation angle to compensate for the reference desired angle of the ankle is calculated using a COG position and velocity of the robot 100. A final desired angle of the ankle is calculated using the reference desired angle and the compensation angle such that the robot 100 keeps balance so as not to fall. Therefore, since the final desired angle has the same balance control performance even when the ground is inclined, the robot 100 may stably and naturally walk. This will be described in detail with reference to FIG. 4.

Figure 4:
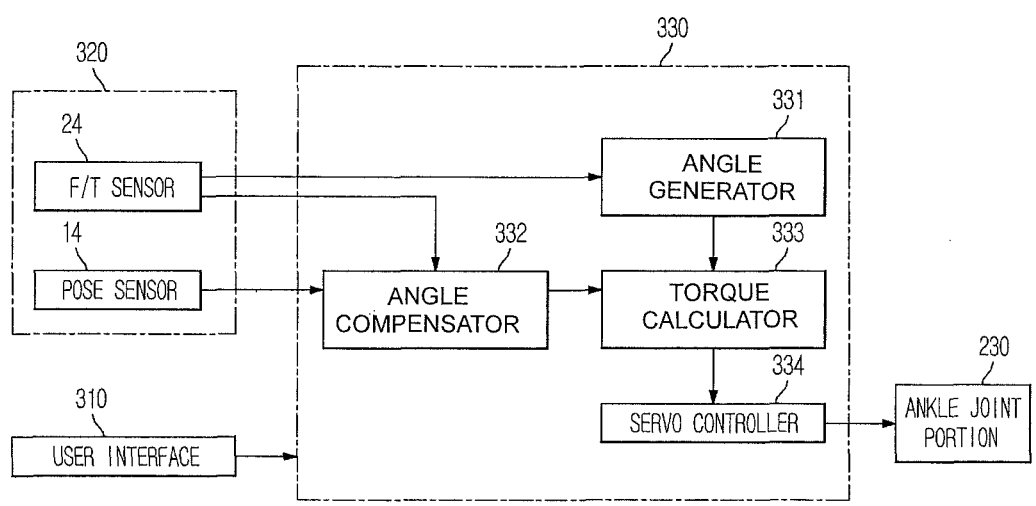
FIG. 4 is a block diagram of a structure to control the walking of the robot according to the embodiment.

FIG. 4 is a block diagram of a structure to control the walking of the robot according to the embodiment of the present invention, which includes a user interface 310, a sensor 320, a walking controller 330 and an ankle joint portion 230.

The user interface 310 receives a user command to control the walking of the robot 100.

The sensor 320 includes the pose sensor 14 which is mounted in the torso 102 of the robot 100 to detect the inclination or pose of the upper body 101, and the F/T sensor 24 which is mounted between the foot 112 and the ankle joint portion 230 of the robot 100 to detect whether the foot 112 touches the ground.

The sensor to detect the pose of the upper body 101 may include a tilting detection sensor and a gyro sensor in addition to the pose sensor 14, and the sensor to detect whether the foot 112 touches the ground may include a contact sensor or another sensor similar thereto in addition to the F/T sensor 24.

The walking controller 330 is a Proportional-Derivative (PD) controller to control the walking of the robot 100 based on the walking command received via the user interface 310 and the sensor information detected by the sensor 320, and includes a angle generator 331, a angle compensator 332, a torque calculator 333 and a servo controller 334.

The angle generator 331 generates a reference desired angle $\theta_{d0}$ of the ankle using the inclination (angle) of the ground as the reference angle for balance control of the robot 100. The reference desired angle $\theta_{d0}$ follows the orientation of a global coordinate system based on the ground.

More particularly, the angle generator 331 determines whether the foot 112 touches the ground based on sensor information detected by the F/T sensor 24 provided between the foot 112 and the ankle joint portion 230 of the robot 100. Using the determined result, it is determined whether the leg 110 is in a swing state or a stance state in which the leg supports the torso 102, while walking.

When the leg 110 is in the swing state and the foot 112 is raised, a prepared trajectory is used as a desired angle.

When the leg 110 supports the torso 102, that is, the leg 110 is in the stance state, and the foot touches the ground, the inclination (angle) of the ground is measured to generate the reference desired angle $\theta_{d0}$ equal to the angle of the ground. That is, if the ground is horizontal, the reference desired angle $\theta_{d0}$ becomes 0.

There are various methods of measuring the inclination (angle) of the ground. For example, the F/T sensor 24 provided between the foot 112 and the ankle joint portion 230 detects whether the foot 112 touches the ground and, when the foot 112 touches the ground, servo gain of the ankle is decreased to make the ankle joint portion 230 flexible. Then, the sole of the foot is closely brought into contact with the ground regardless of the desired angle of the ankle and, at this time, the angle of the ankle is used as the inclination (angle) of the ground. Thereafter, the ankle joint portion 230 returns to original servo gain.

The angle compensator 332 calculates a compensation angle $\theta_{d\_compensator}$ to compensate for the reference desired angle $\theta_{d0}$ generated by the desired angle generator 331 using the COG position and velocity of the robot 100.

More particularly, the angle compensator 332 determines whether the foot 112 touches the ground based on the sensor information detected by the F/T sensor 24 provided between the foot 112 and the ankle joint portion 230 of the robot 100. Using the determined result, it is determined whether the leg 110 is in the swing state or the stance state in which the leg supports the torso 102.

When the leg 110 is in the swing state and the foot 112 is raised, balancing using the ankle is not used and thus a compensation value is not obtained.

Figure 5:
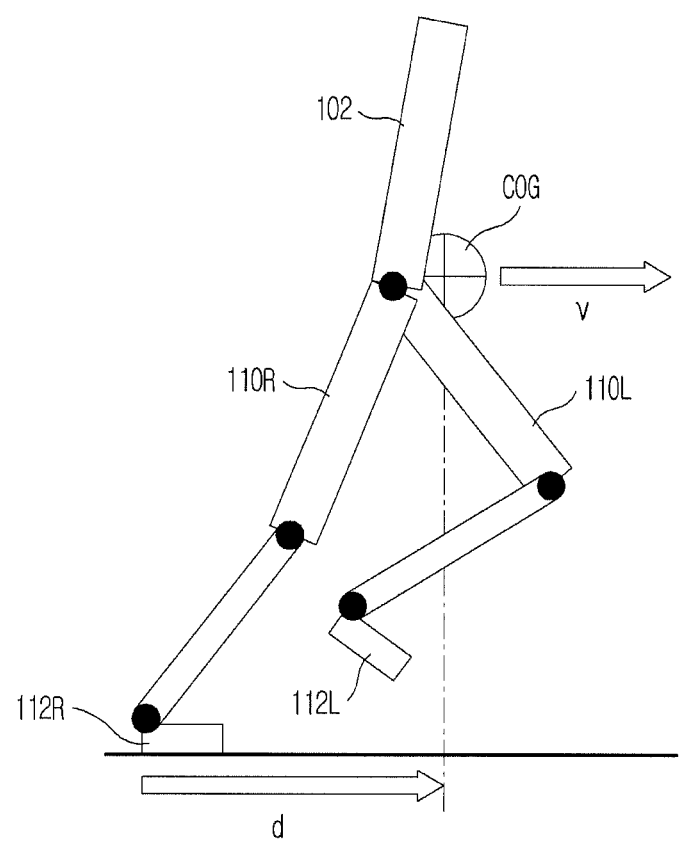
FIG. 5 is a side view showing leg states when the robot walks according to the embodiment.

In the stance state in which the leg 110 supports the torso 102, the COG position and velocity of the robot 100 are obtained using the pose sensor 14 of the robot 100 and forward kinematics. The COG position of the robot 100 is expressed by a distance from the center of a stance foot 112R to the COG of the robot 100 as shown in FIG. 5. At this time, the orientation of the distance follows the orientation of the global coordinate system fixed to the direction of gravity.

The desired angle compensator 332 calculates the compensation angle $\theta_{d\_compensator}$ to compensate for the reference desired angle $\theta_{d0}$ of the ankle using the COG position and the velocity of the robot 100 as expressed by Equation 1.

$$\theta_{d\_compensator} = Cd^*(d_{Actual} - d_{Desired}) + Cv^*(v_{Actual} - v_{Desired})$$ Equation 1

In Equation 1, $d_{Actual}$ denotes an actual horizontal distance from the stance foot 112R to the COG, $d_{Desired}$ denotes a desired horizontal distance from the stance foot 112R to the COG, $v_{Actual}$ denotes an actual horizontal velocity of the COG, and $v_{Desired}$ denotes a desired horizontal velocity of the COG.

In addition, Cd and Cv are variables to maintain balance or to control pose according to the movement velocity of the robot 100.

For example, if the variable Cd is large, the robot 100 easily maintains balance when the robot 100 moves slowly and, if the variable Cd is small, the robot 100 easily controls its pose when the robot 100 moves quickly.

The torque calculator 333 calculates the final desired angle $\theta_d$ of the ankle using the reference desired angle $\theta_{d0}$ generated by the angle generator 331 and the compensation angle $\theta_{d\_compensator}$ calculated by the angle compensator 332 such that the robot 100 maintains balance not to fall, and calculates desired torque to follow trajectory of the calculated final desired angle $\theta_d$.

The torque calculator 333 calculates the final desired angle $\theta_d$ using the reference desired angle $\theta_{d0}$ and the compensation angle $\theta_{d\_compensator}$ as expressed by Equation 2 such that the robot 100 maintains balance not to fall.

$$\theta_d = \theta_{d0} + \theta_{d\_compensator}$$ Equation 2

In Equation 2, the reference desired angle $\theta_{d0}$ and the final desired angle $\theta_d$ follow the orientation of the global coordinate system based on the ground.

Accordingly, since the final desired angle $\theta_d$ based on the orientation of the global coordinate system has the same balance control performance even when the ground is inclined, balance control effects of the robot 100 are increased.

The servo controller 334 provides the desired torque calculated by the desired torque calculator 333 to the ankle joint portion 230 of the leg 110 supporting the torso 102 and outputs a torque control signal corresponding to the desired torque calculated in order to drive an actuator such as a motor mounted in the ankle joint portion 230 to the ankle joint portion 230.

Accordingly, the ankle joint portion 230 receives the torque control signal from the servo controller 334 to drive the actuator such as the motor mounted in the ankle joint portion 230, such that the robot 100 stably walks while maintaining the same balance control performance even when the ground is inclined.

FIG. 5 is a side view showing leg states when the robot walks according to the embodiment, in which the torso 102 and the left and right legs 110L and 110R of the robot 100 are shown on an X-Z plane (2D space) of the roll direction (X-axis) and the yaw direction (Z-axis) and the states in which the robot walks forward while alternately using its feet 112L and 112R are schematically shown on the X-Z plane.

Hereinafter, the operation and effect of a method of controlling the walking of a robot according to an embodiment will be described.

Figure 6:
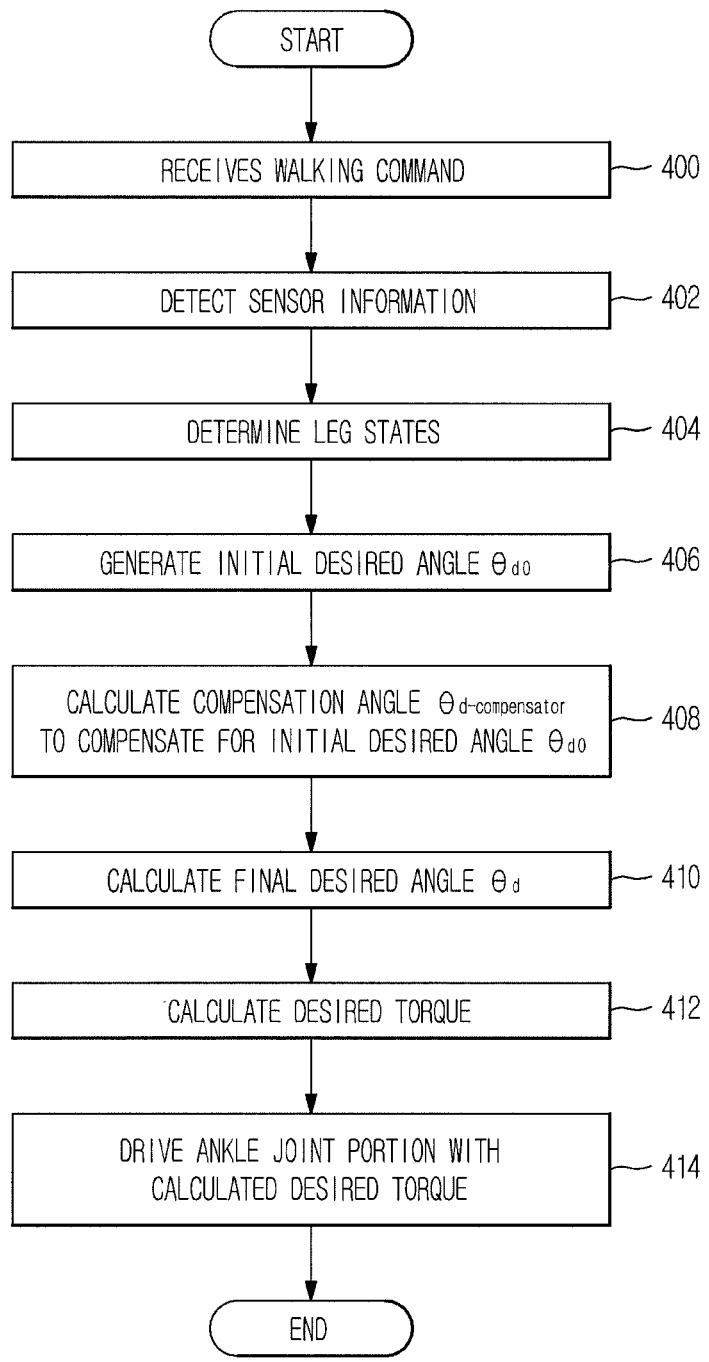
FIG. 6 is a flowchart illustrating a method of controlling the walking of the robot according to the embodiment.

FIG. 6 is a flowchart illustrating a method of controlling the walking of the robot according to the embodiment.

In FIG. 6, a user command to control the walking of the robot 100 is input via the user interface 310 (400).

When a walking command is input, the pose sensor 14 mounted in the torso 102 of the robot 100 detects and transmits the inclination or pose of the upper body 101 to the angle compensator 332 of the walking controller 330. The F/T sensor 24 provided between the foot 112 and the ankle joint portion 230 of the robot 100 detects whether the foot 112 touches the ground and transmits the detected result to the angle generator 331 and the angle compensator 332 of the walking controller 330 (402).

Accordingly, the angle generator 331 and the angle compensator 332 determine whether the foot 112 touches the ground based on the sensor information detected by the F/T sensor 24. Using the determined result, it is determined whether the leg 110 is in the swing state or the stance state in which the leg supports the torso 102 (404).

Subsequently, the angle generator 331 uses the prepared trajectory as the desired angle when the foot 112 is raised and generates and transmits the reference desired angle $\theta_{d0}$ equal to the angle of the ground to the torque calculator 333 when the foot 112 touches the ground, according to the determined state of the leg 110 (406). The reference desired angle $\theta_{d0}$ follows the orientation of the global coordinate system.

The angle compensator 332 calculates the compensation angle $\theta_{d\_compensator}$ to compensate for the reference desired angle $\theta_{d0}$ generated by the angle generator 331 using Equation 3 (408).

$$\theta_{d\_compensator} = Cd^*(d_{Actual} - d_{Desired}) + Cv^*(v_{Actual} - v_{Desired})$$

When the leg 110 is in the swing state, balancing using the ankle is not used and thus a compensation value is not obtained. In the stance state in which the leg 110 supports the torso 102, the COG position and velocity of the robot 100 are obtained, and the compensation angle $\theta_{d\_compensator}$ is calculated and transmitted to the torque calculator 333.

The torque calculator 333 calculates the final desired angle $\theta_d$ using the reference desired angle $\theta_{d0}$ generated by the angle generator 331 and the compensation angle $\theta_{d\_compensator}$ calculated by the angle compensator 332 as expressed by Equation 3 such that the robot 100 maintains balance not to fall (410).

$$\theta_d = \theta_{d0} + \theta_{d\_compensator} \qquad \text{Equation 4}$$

In Equation 4, the reference desired angle $\theta_{d0}$ and the final desired angle $\theta_d$ follow the orientation of the global coordinate system based on the ground.

Subsequently, the torque calculator 333 calculates the desired torque to follow the trajectory of the calculated final desired angle $\theta_d$ (412).

Thereafter, the servo controller 334 provides the desired torque calculated by the torque calculator 333 to the ankle joint portion 230 of the leg 110 supporting the torso 102 to drive the actuator such as the motor mounted in the ankle joint portion 230 (414), such that the robot 100 stably walks while maintaining the same balance control performance even when the ground is inclined.

Accordingly, even when the ground is not horizontal, the balance of the robot 100 may be kept. When the robot 100 moves slowly or quickly, the robot may stay balanced.

Since the balance of the robot 100 is maintained using the ankle of the leg supporting the torso 102 even when the ground is inclined, the method is simple and is applicable to the robot 100 having joints with 6 degrees of freedom.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A walking robot having a plurality of legs and a foot provided in each of the plurality of legs, the walking robot comprising:

a first sensor to detect whether the foot touches ground when the robot walks;
a second sensor to detect a pose of the robot when the foot touches the ground; and
a walking controller to control a servo gain of an ankle joint of the robot to increase flexibility of the ankle joint of the robot before and/or at a time when the foot touches the ground, to determine an angle of the ground based on a measured angle of the ankle of the robot when the foot is touching the ground, and to generate a reference desired angle of the ankle of the robot to maintain robot balance when the foot touches the ground,
wherein the walking controller includes:
an angle compensator to compensate for the reference desired angle of the ankle of the robot to control walking of the robot, to obtain a Center of Gravity (COG) position and a velocity of the robot according to the pose of the robot, and to calculate a compensation angle of the ankle of the robot using the COG position and the velocity of the robot.

2. The walking robot according to claim 1, wherein the first sensor includes a Force and Torque (F/T) sensor provided in the foot and/or an ankle joint portion of the robot to detect whether the foot touches the ground.

3. The walking robot according to claim 1, wherein the second sensor includes a pose sensor mounted in an upper body of the robot to detect inclination or pose of the upper body.

4. The walking robot according to claim 1, wherein the angle of the ground is an angle indicating the inclination of the foot relative to the ground.

5. The walking robot according to claim 4, wherein the reference desired angle is a desired angle of the foot relative to the ground.

6. The walking robot according to claim 1, wherein the walking controller further includes:
an angle generator to generate the reference desired angle of the ankle of the robot relative to the angle of the ground according to the measured angle of the ankle when the foot touches the ground, and
a torque calculator to calculate a final desired angle of the ankle of the robot using the reference desired angle of the ankle of the robot and the compensation angle of the ankle of the robot, and to calculate torque using the calculated final desired angle.

7. The walking robot according to claim 6, wherein the angle generator generates the reference desired angle using the angle of the ground as a control desired angle to keep ankle balance.

8. The walking robot according to claim 6, wherein the reference desired angle, the compensation angle and the final desired angle follow the orientation of a global coordinate system.

9. The walking robot according to claim 1, wherein the walking robot is a robot having two legs, which walks using a torque based Finite State Machine (FSM) control method.

10. A method of controlling balance of a walking robot including a plurality of legs and a foot provided in each of the plurality of legs, the method comprising:
detecting whether the foot touches ground when the robot walks;
controlling a servo gain of an ankle joint of the robot to increase flexibility of the ankle joint of the robot before and/or at a time when the foot touches the ground;
determining an angle of the ground, based on a measured angle of the ankle of the robot when the foot is touching the ground, to generate a reference desired angle of the ankle of the robot to maintain robot balance when the foot touches the ground;

detecting a pose of the robot to compensate for the reference desired angle of the ankle of the robot by calculating a compensation angle of the ankle of the robot using a Center of Gravity (COG) position and a velocity of the robot; and calculating a final desired angle of the ankle according to the reference desired angle and the compensation angle to control walking of the robot, wherein the calculation of the compensation angle includes obtaining the COG position and the velocity of the robot according to the pose of the robot.

11. The method according to claim 10, wherein the angle of the ground is an angle indicating the inclination of the foot relative to the ground.

12. The method according to claim 11, wherein the reference desired angle is a desired angle of the foot relative to the ground.

13. The method according to claim 10, wherein the generation of the reference desired angle includes generating the reference desired angle of the ankle relative to the ground according to the angle of the ground.

14. The method according to claim 10, wherein the calculation of the final desired angle includes calculating the desired angle of the ankle as a compensation value obtained by adding the compensation angle to the reference desired angle.

15. The method according to claim 10, wherein the calculation of the final desired angle includes calculating the desired angle of the ankle as a control reference angle to keep ankle balance.

16. The method according to claim 10, wherein the reference desired angle, the compensation angle and the final desired angle follow the orientation of a global coordinate system.

17. The method according to claim 10, the method further comprising:

calculating desired torque to follow a trajectory of the calculated final desired angle; and driving ankle joint portion with calculated desired torque.

18. The walking robot according to claim 1, wherein the compensation angle is $\theta_{d\_compensator}$ and is expressed by the equation:

$$\theta_{d\_compensator} = Cd^*(d_{Actual} - d_{Desired}) + Cv^*(V_{Actual} - V_{Desired}),$$

wherein Cd and Cv are variables to maintain balance or to control pose according to the movement velocity of the robot, wherein $V_{Actual}$ corresponds with an actual horizontal velocity of the COG of the robot, wherein $V_{Desired}$ corresponds with a desired horizontal velocity of the COG of the robot, wherein $d_{Actual}$ corresponds with an actual horizontal distance between the/a stance foot to the COG, and wherein $d_{Desired}$ corresponds with a desired horizontal distance between the stance foot to the COG.

19. The walking robot according to claim 6, an ankle joint portion of the robot; and a servo controller to control the ankle joint portion based on a torque control command that corresponds with the calculated torque of the torque calculator.

20. The walking robot according to claim 6, wherein the angle generator determines whether or not the foot, corresponding to one of the plurality of legs, touches the ground, based on information detected by the first sensor, wherein:

if the angle generator determines the one of the plurality of legs is in a swing state, in which the foot does not touch the ground, a prepared trajectory is used to generate the reference desired angle of the ankle of the robot, or if the angle generator determines the one of the plurality of legs is in a stance state, in which the foot touches the ground, the inclination of the ground is measured to generate the reference desired angle of the ankle of the robot.

* * * * *